(12) United States Patent
Ijaz et al.

(10) Patent No.: US 12,316,459 B2
(45) Date of Patent: May 27, 2025

(54) COMMUNICATION SYSTEM

(71) Applicant: NEC Corporation, Tokyo (JP)

(72) Inventors: Ayesha Ijaz, Guildford (GB); Takahiro Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/023,970

(22) PCT Filed: Oct. 14, 2021

(86) PCT No.: PCT/JP2021/037980
§ 371 (c)(1),
(2) Date: Feb. 28, 2023

(87) PCT Pub. No.: WO2022/080436
PCT Pub. Date: Apr. 21, 2022

(65) Prior Publication Data
US 2023/0246745 A1  Aug. 3, 2023

(30) Foreign Application Priority Data

Oct. 15, 2020  (GB) ..................... 2016378

(51) Int. Cl.
*H04L 1/1812* (2023.01)
*H04L 1/1829* (2023.01)
*H04L 5/00* (2006.01)

(52) U.S. Cl.
CPC .......... *H04L 1/1812* (2013.01); *H04L 1/1861* (2013.01); *H04L 1/1864* (2013.01); *H04L 5/0055* (2013.01)

(58) Field of Classification Search
CPC ... H04L 1/1812; H04L 1/1861; H04L 1/1864; H04L 5/0055; H04L 5/00
See application file for complete search history.

(56) References Cited

U.S. PATENT DOCUMENTS

2019/0165894 A1  5/2019  Choi et al.
2020/0145143 A1*  5/2020  Nemeth ............... H04L 1/1819
(Continued)

FOREIGN PATENT DOCUMENTS

CN       101043426 A     9/2007
GB         2581391 A     8/2020
(Continued)

OTHER PUBLICATIONS

A. Karimi, K. I. Pedersen, N. H. Mahmood, G. Pocovi and P. Mogensen, "Efficient Low Complexity Packet Scheduling Algorithm for Mixed URLLC and eMBB Traffic in 5G," 2019 IEEE 89th Vehicular Technology Conference (VTC2019-Spring), Kuala Lumpur, Malaysia, 2019.*
(Continued)

*Primary Examiner* — Steve N Nguyen
(74) *Attorney, Agent, or Firm* — Sughrue Mion, PLLC

(57) ABSTRACT

A communication system is disclosed in which a user equipment (UE) receives data associated with an Ultra-Reliable and Low-Latency Communications (URLLC) service and data associated with an Enhanced Mobile Broadband (eMBB) service. The UE generates a first Hybrid Automatic Repeat Request (HARQ) codebook for URLLC service and a second HARQ codebook for the eMBB service, bundles the first HARQ codebook into a single bit, and appends it to the end of the second HARQ codebook to form a multiplexed HARQ codebook. The UE then transmits the multiplexed HARQ codebook to the access network node.

5 Claims, 6 Drawing Sheets

(56) References Cited

U.S. PATENT DOCUMENTS

| | | | |
|---|---|---|---|
| 2020/0228173 A1* | 7/2020 | Ye | H04L 5/0055 |
| 2020/0235867 A1 | 7/2020 | Choi et al. | |
| 2020/0252167 A1* | 8/2020 | Kwak | H04L 1/1812 |
| 2020/0304245 A1* | 9/2020 | Zhou | H04B 7/0482 |
| 2020/0313745 A1* | 10/2020 | Yang | H04L 5/0055 |
| 2020/0314815 A1* | 10/2020 | Kim | H04L 1/1671 |
| 2021/0376961 A1* | 12/2021 | Shao | H04L 1/1861 |
| 2021/0391956 A1 | 12/2021 | Gou et al. | |
| 2022/0053483 A1 | 2/2022 | Yoshioka et al. | |
| 2022/0123875 A1 | 4/2022 | Liang et al. | |

FOREIGN PATENT DOCUMENTS

| | | | |
|---|---|---|---|
| JP | 2019-522423 A | 8/2019 | |
| WO | 2020/065740 A | 4/2020 | |
| WO | 2020/088676 A1 | 5/2020 | |
| WO | 2020/201385 A1 | 10/2020 | |

OTHER PUBLICATIONS

International Search Report for PCT Application No. PCT/JP2021/037980, mailed on Mar. 4, 2022.

English translation of Written opinion for PCT Application No. PCT/JP2021/037980, mailed on Mar. 4, 2022.

SR dated Jul. 30, 2021 for GB2016378.8

Qualcomm Incorporated: "Intra-UE multiplexing and prioritization for IOT and URLLC"; 3GPP Draft; R1-2006802, Aug. 2020.

The Next Generation Mobile Networks (NGMN) Alliance, "NGMN 5G White Paper", V1.0, Feb. 2015.

"3rd Generation Partnership Project; Technical Specification Group Radio Access Network; NR; NR and NG-RAN Overall Description; Stage 2 (Release 16)", 3GPP Technical Specification (TS) 38.300 V16.3.0, Sep. 2020.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.3.0, Sep. 2020.

"3rd Generation Partnership Project; Technical Specification Group Radio Access Network; Study on New Radio (NR) access technology (Release 16)", 3GPP TR 38.912 V16.0.0, Jul. 2020.

JP Office Action for JP Application No. 2023-514065, mailed on Jan. 16, 2024 with English Translation.

CN Office Action for CN Application No. 202180062131.0, mailed on Mar. 14, 2025 with English Translation.

* cited by examiner

COMMUNICATION SYSTEM

This application is a National Stage Entry of PCT/JP2021/037980 filed on Oct. 14, 2021, which claims priority from British Patent Application 2016378.8 filed on Oct. 15, 2020, the contents of all of which are incorporated herein by reference, in their entirety.

TECHNICAL FIELD

The present invention relates to a wireless communication system and devices thereof operating according to the 3rd Generation Partnership Project (3GPP) standards or equivalents or derivatives thereof. The disclosure has particular but not exclusive relevance to improvements relating to transmission of Hybrid Automatic Repeat Request Acknowledgement (HARQ-ACK) feedback in the so-called '5G' (or 'Next Generation') systems.

BACKGROUND ART

The latest developments of the 3GPP standards are the so-called '5G' or 'New Radio' (NR) standards which refer to an evolving communication technology that is expected to support a variety of applications and services such as Machine Type Communications (MTC), Internet of Things (IoT)/Industrial Internet of Things (IIoT) communications, vehicular communications and autonomous cars, high resolution video streaming, smart city services, and/or the like. 3GPP intends to support 5G by way of the so-called 3GPP Next Generation (NextGen) radio access network (RAN) and the 3GPP NextGen core (NGC) network. Various details of 5G networks are described in, for example, the 'NGMN 5G White Paper' V1.0 by the Next Generation Mobile Networks (NGMN) Alliance, which document is available from https://www.ngmn.org/5g-white-paper.html.

End-user communication devices are commonly referred to as User Equipment (UE) which may be operated by a human or include automated (MTC/IoT) devices. Whilst a base station of a 5G/NR communication system is commonly referred to as a New Radio Base Station ('NR-BS') or as a 'gNB' it will be appreciated that they may be referred to using the term 'eNB' (or 5G/NR eNB) which is more typically associated with Long Term Evolution (LTE) base stations (also commonly referred to as '4G' base stations). 3GPP Technical Specification (TS) 38.300 V16.3.0 and TS 37.340 V16.3.0 define the following nodes, amongst others:

gNB: node providing NR user plane and control plane protocol terminations towards the UE, and connected via the NG interface to the 5G core network (5GC).

ng-eNB: node providing Evolved Universal Terrestrial Radio Access (E-UTRA) user plane and control plane protocol terminations towards the UE, and connected via the NG interface to the 5GC.

En-gNB: node providing NR user plane and control plane protocol terminations towards the UE, and acting as Secondary Node in E-UTRA-NR Dual Connectivity (EN-DC).

NG-RAN node: either a gNB or an ng-eNB.

3GPP also defined the so-called 'Xn' interface as the network interface between neighbouring NG-RAN nodes.

The Physical Uplink Control Channel (PUCCH) carries a set of information called Uplink Control Information (UCI). The format of the PUCCH depends on what kind of information the UCI carries. The PUCCH format to be used is determined by how many bits of information should be carried and how many symbols are assigned. The UCI used in NR (5G) includes one or more of the following information: Channel State Information (CSI); ACK/NAK; and Scheduling Request (SR). This is generally the same as in LTE (4G).

The next-generation mobile networks support diversified service requirements, which have been classified into three categories by the International Telecommunication Union (ITU): Enhanced Mobile Broadband (eMBB); Ultra-Reliable and Low-Latency Communications (URLLC); and Massive Machine Type Communications (mMTC). eMBB aims to provide enhanced support of conventional mobile broadband, with focus on services requiring large and guaranteed bandwidth such as High Definition (HD) video, Virtual Reality (VR), and Augmented Reality (AR). URLLC is a requirement for critical applications such as automated driving and factory automation, which require guaranteed access within a very short time. MMTC needs to support massive number of connected devices such as smart metering and environment monitoring but can usually tolerate certain access delay. It will be appreciated that some of these applications may have relatively lenient Quality of Service/Quality of Experience (QoS/QoE) requirements, while some applications may have relatively stringent QoS/QoE requirements (e.g. high bandwidth and/or low latency).

In Release 16, when uplink transmissions of different priorities overlap this is resolved by dropping lower priority transmissions. This approach allows prioritisation of URLLC traffic (which has relatively high priority) and associated HARQ feedback over other types of transmissions but it is inefficient in case there is eMBB traffic as well. For instance, when HARQ feedback for downlink eMBB data is dropped due to the prioritisation of URLLC feedback (over eMBB feedback), system efficiency is affected due to the need to retransmit eMBB data for which no feedback (acknowledgement) has been received.

In Release 17, enhancements to Industrial Internet of Things (IIoT) and URLLC aim to specify the required multiplexing behaviour among HARQ-ACK/SR/CSI and Physical Uplink Shared Channel (PUSCH) for different traffic types with different priorities. This behaviour may be applied to the UCI regardless whether it is transmitted on the PUCCH or PUSCH. In a recent 3GPP meeting (RAN1 #102) it has been agreed that multiplexing a high-priority HARQ-ACK and a low-priority HARQ-ACK into a PUCCH will be supported in Release 17, although no further details are known. The key principle is the need to guarantee the latency and reliability for URLLC UCI transmissions.

There are some proposals for eMBB HARQ-ACK codebook size reduction to minimise impact on high priority HARQ-ACK (e.g. URLLC). Such size reduction may be achieved, for example, by compressing the eMBB HARQ-ACK codebook, using a transport block (TB) based feedback, or by discarding as many component carriers as necessary in order to fit feedback into the UCI payload size. Alternatively, the maximum allowable code rate may be configured independently for eMBB and URLLC HARQ-ACKs, and the final payload may be adjusted by suppressing eMBB HARQ-ACK or by enlarging URLLC HARQ-ACK. Spatialbundling may be used to generate the low priority HARQ codebook irrespective of the relevant RRC configuration.

SUMMARY OF INVENTION

However, none of the existing techniques have been accepted by 3GPP. Accordingly, the present invention seeks to provide methods and associated apparatus that address or at least alleviate (at least some of) the above described issues regarding prioritisation of URLLC traffic and associated HARQ feedback over other types of transmissions.

Although for efficiency of understanding for those of skill in the art, the invention will be described in detail in the context of a 3GPP system (5G networks), the principles of the invention can be applied to other systems as well.

In one example aspect, the invention provides a method performed by a user equipment (UE), the method including: receiving, from an access network node, signals carrying data associated with a first, Ultra-Reliable and Low-Latency Communications (URLLC), service and data associated with a second service; generating a first Hybrid Automatic Repeat Request (HARQ) codebook for the data associated with the URLLC service and generating a second HARQ codebook for the data associated with the second service; generating, based on the first HARQ codebook, HARQ information for the URLLC service and multiplexing the HARQ information for the URLLC service with the second HARQ codebook to derive a multiplexed HARQ codebook; and transmitting, to the access network node, the multiplexed HARQ codebook using at least one communication resource associated with URLLC.

In one example aspect, the invention provides a method performed by a user equipment (UE), the method including: receiving, from an access network node, signals carrying data associated with a first, Ultra-Reliable and Low-Latency Communications (URLLC), service and data associated with a second service; generating a first Hybrid Automatic Repeat Request (HARQ) codebook for the data associated with the URLLC service and generating a second HARQ codebook for the data associated with the second service; bundling one of the first HARQ codebook and the second HARQ codebook to one bit, in dependence on at least one predetermined rule; multiplexing the bundled bit with the other one of the first HARQ codebook and the second HARQ codebook to derive a multiplexed HARQ codebook; and transmitting, to the access network node, the multiplexed HARQ codebook.

In one example aspect, the invention provides a method performed by an access network node, the method including: transmitting, to a user equipment (UE), signals carrying data associated with a first, Ultra-Reliable and Low-Latency Communications (URLLC), service and data associated with a second service; and receiving, from the UE, a multiplexed Hybrid Automatic Repeat Request (HARQ) codebook using at least one communication resource associated with URLLC, wherein the multiplexed HARQ codebook is based on HARQ information for the URLLC service generated based on a first HARQ codebook for the data associated with the URLLC service and multiplexed with a second HARQ codebook for the data associated with the second service.

In one example aspect, the invention provides a method performed by an access network node, the method including: transmitting, to a user equipment (UE), signals carrying data associated with a first, Ultra-Reliable and Low-Latency Communications (URLLC), service and data associated with a second service; and receiving, from the UE, a multiplexed Hybrid Automatic Repeat Request (HARQ) codebook, wherein the multiplexed HARQ codebook includes i) a first HARQ codebook for the data associated with one of the URLLC service and the second service and ii) a bundled bit based on a second HARQ codebook for the data associated with the other one of the URLLC service and the second service.

In one example aspect, the invention provides a user equipment (UE) including: means for receiving, from an access network node, signals carrying data associated with a first, Ultra-Reliable and Low-Latency Communications (URLLC), service and data associated with a second service; means for generating a first Hybrid Automatic Repeat Request (HARQ) codebook for the data associated with the URLLC service and for generating a second HARQ codebook for the data associated with the second service; means for generating, based on the first HARQ codebook, HARQ information for the URLLC service and for multiplexing the HARQ information for the URLLC service with the second HARQ codebook to derive a multiplexed HARQ codebook; and means for transmitting, to the access network node, the multiplexed HARQ codebook using at least one communication resource associated with URLLC.

In one example aspect, the invention provides a user equipment (UE) including: means for receiving, from an access network node, signals carrying data associated with a first, Ultra-Reliable and Low-Latency Communications (URLLC), service and data associated with a second service; means for generating a first Hybrid Automatic Repeat Request (HARQ) codebook for the data associated with the URLLC service and for generating a second HARQ codebook for the data associated with the second service; means for bundling one of the first HARQ codebook and the second HARQ codebook to one bit, in dependence on at least one predetermined rule; means for multiplexing the bundled bit with the other one of the first HARQ codebook and the second HARQ codebook to derive a multiplexed HARQ codebook; and means for transmitting, to the access network node, the multiplexed HARQ codebook.

In one example aspect, the invention provides an access network node including: means for transmitting, to a user equipment (UE), signals carrying data associated with a first, Ultra-Reliable and Low-Latency Communications (URLLC), service and data associated with a second service; and means for receiving, from the UE, a multiplexed Hybrid Automatic Repeat Request (HARQ) codebook using at least one communication resource associated with URLLC, wherein the multiplexed HARQ codebook is based on HARQ information for the URLLC service generated based on a first HARQ codebook for the data associated with the URLLC service and multiplexed with a second HARQ codebook for the data associated with the second service.

In one example aspect, the invention provides an access network node including: means for transmitting, to a user equipment (UE), signals carrying data associated with a first, Ultra-Reliable and Low-Latency Communications (URLLC), service and data associated with a second service; and means for receiving, from the UE, a multiplexed Hybrid Automatic Repeat Request (HARQ) codebook, wherein the multiplexed HARQ codebook includes i) a first HARQ codebook for the data associated with one of the URLLC service and the second service and ii) a bundled bit based on a second HARQ codebook for the data associated with the other one of the URLLC service and the second service.

In another example aspect, the invention provides a user equipment (UE) including a controller and a transceiver, wherein the transceiver is configured to receive, from an access network node, signals carrying data associated with a first, Ultra-Reliable and Low-Latency Communications (URLLC), service and data associated with a second service; the controller is configured to generate a first Hybrid Automatic Repeat Request (HARQ) codebook for the data associated with the URLLC service and generate a second HARQ codebook for the data associated with the second service; the controller is configured to generate, based on the first HARQ codebook, HARQ information for the URLLC service and multiplex the HARQ information for the URLLC service with the second HARQ codebook to derive a multiplexed HARQ codebook; and the transceiver is configured to transmit, to the access network node, the multiplexed HARQ codebook using at least one communication resource associated with URLLC.

In another example aspect, the invention provides a user equipment (UE) including a controller and a transceiver, wherein the transceiver is configured to receive, from an access network node, signals carrying data associated with a first, Ultra-Reliable and Low-Latency Communications (URLLC), service and data associated with a second service; the controller is configured to generate a first Hybrid Automatic Repeat Request (HARQ) codebook for the data associated with the URLLC service and generate a second HARQ codebook for the data associated with the second service; the controller is configured to bundle one of the first HARQ codebook and the second HARQ codebook to one bit, in dependence on at least one predetermined rule; the controller is configured to multiplex the bundled bit with the other one of the first HARQ codebook and the second HARQ codebook to derive a multiplexed HARQ codebook; and the transceiver is configured to transmit, to the access network node, the multiplexed HARQ codebook.

In another example aspect, the invention provides an access network node a controller and a transceiver, wherein the transceiver is configured to: transmit, to a user equipment (UE), signals carrying data associated with a first, Ultra-Reliable and Low-Latency Communications (URLLC), service and data associated with a second service; and receive, from the UE, a multiplexed Hybrid Automatic Repeat Request (HARQ) codebook using at least one communication resource associated with URLLC, wherein the multiplexed HARQ codebook is based on HARQ information for the URLLC service generated based on a first HARQ codebook for the data associated with the URLLC service and multiplexed with a second HARQ codebook for the data associated with the second service.

In another example aspect, the invention provides an access network node a controller and a transceiver, wherein the transceiver is configured to: transmit, to a user equipment (UE), signals carrying data associated with a first, Ultra-Reliable and Low-Latency Communications (URLLC), service and data associated with a second service; and receive, from the UE, a multiplexed Hybrid Automatic Repeat Request (HARQ) codebook, wherein the multiplexed HARQ codebook includes i) a first HARQ codebook for the data associated with one of the URLLC service and the second service and ii) a bundled bit based on a second HARQ codebook for the data associated with the other one of the URLLC service and the second service.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

Figure 1:
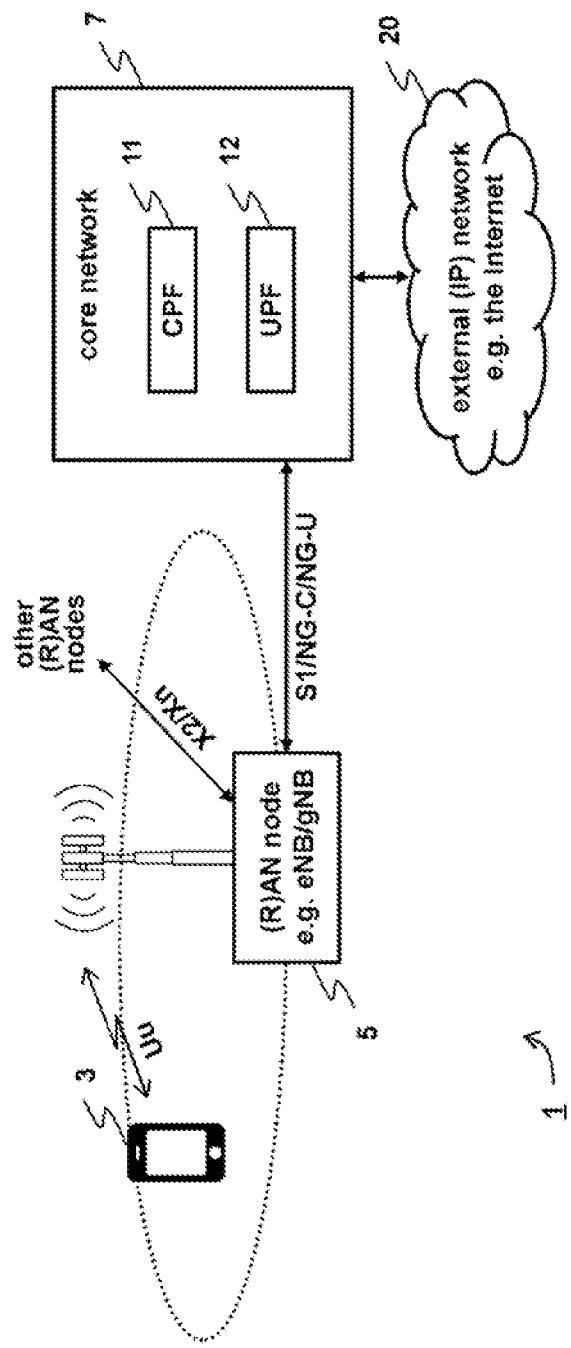
FIG. 1 illustrates schematically a mobile (cellular or wireless) telecommunication system to which example embodiments of the invention may be applied.

FIG. 1 illustrates schematically a mobile (cellular or wireless) telecommunication system 1 to which example embodiments of the invention may be applied.

In this system 1, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations/RAN nodes and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G protocols, and/or any other 3GPP or non-3GPP communication protocols.

The mobile devices 3 and their serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'NG-C', 'NG-U' interface, and/or the like).

The core network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). For example, the core network 7 of a 'Next Generation'/5G system will include user plane entities and control plane entities. In this example, the core network includes at least one control plane function (CPF) 11 and at least one user plane function (UPF) 12. The core network 7 is also coupled (via the UPF 12) to a Data Network (DN) 20, such as the Internet or a similar Internet Protocol (IP) based network (denoted 'external network' in FIG. 1).

It will be appreciated that each mobile device 3 may support various services with different priorities. The services may fall into one of the categories defined above (URLLC/eMBB/mMTC). Each service will typically have associated requirements (e.g. latency/data rate/packet loss requirements, etc.), which may be different for different services. It will be appreciated that URLLC has a relatively higher priority than other services in order to ensure the appropriate (low) latency for this service.

When the UE 3 is receiving data for a particular service (e.g. URLLC), it transmits appropriate HARQ-ACK feedback to the base station 5 using resources associated with that service. Normally, the HARQ-ACK feedback is provided in the form of a codebook (a string of bits), the bits of the codebook representing which data has been received successfully and which not. Since URLLC is designed for high reliability, in most cases URLLC data will be received successfully and the associated HARQ feedback will carry ACKs (acknowledgements). Beneficially, in this system, URLLC related feedback (or information representing the feedback) is provided after the bits carrying the eMBB feedback, in the form of one bit (i.e. a single bit). Effectively, the URLLC feedback is bundled to one bit of information and this information is appended to the end of the eMBB HARQ feedback. In other words, the eMBB feedback and the URLLC feedback (in the form of a bundled bit) are multiplexed to form a combined codebook (eMBB codebook+1 bit representing the URLLC codebook). Beneficially, in order ensure that latency requirements for URLLC are met, the multiplexed feedback is transmitted on the URLLC HARQ-ACK resource rather than the eMBB resource. By prioritising eMBB feedback over URLLC feedback (since the HARQ feedback for eMBB is more likely to carry a NACK than that of URLLC) and by sending the full eMBB codebook to the transmitter (base station 5), the transmitter can determine exactly which part of the eMBB data needs to be retransmitted while also indicating whether transmission of URLLC data was successful.

In a variation of the above approach, the type of service being bundled is determined based on one or more rules. For example, the following rules may be used: if the URLLC codebook carries both ACK and NACK, then the eMBB bits are bundled into 1 bit and appended at the end of the URLLC codebook; if the URLLC codebook carries only ACK (or only NACK), then the URLLC bits are bundled into 1 bit and appended at the end of the eMBB codebook. When the bundled eMBB feedback indicates NACK (first case above), the full eMBB codebook may be transmitted later (e.g. using the normal eMBB HARQ resource).

Alternatively, the rules may specify that if the URLLC codebook carries ACK only or NACK only, and if the eMBB codebook carries both ACK and NACK, then bundle the URLLC bits into 1 bit and append at the end of the eMBB codebook. Otherwise, bundle the eMBB bits into 1 bit and append at the end of the URLLC codebook. If one of these rules is applied, an indication of which codebook is bundled may be provided either explicitly (e.g. using an additional bit) or implicitly (e.g. based on which resource is used for transmitting the feedback).

User Equipment (UE)

Figure 2:
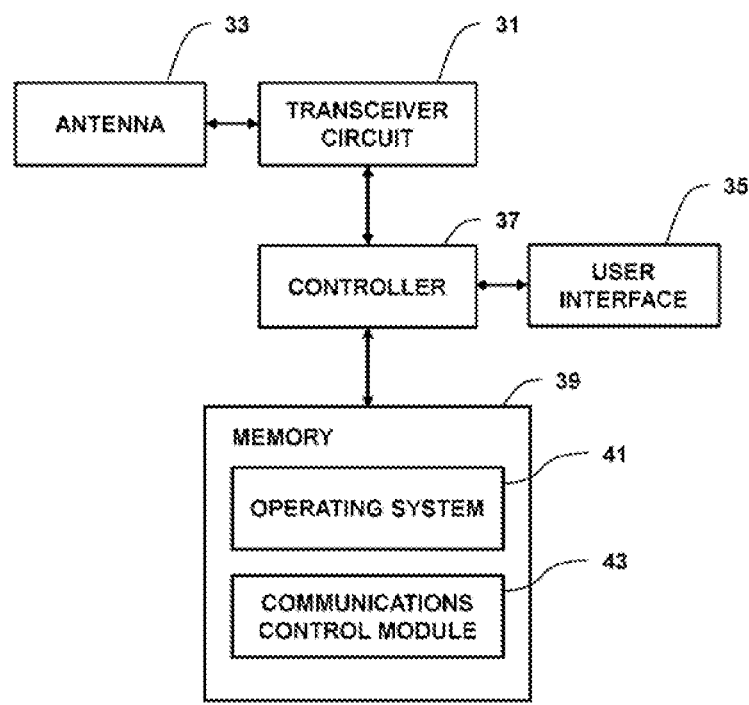
FIG. 2 is a schematic block diagram of a mobile device forming part of the system shown in FIG. 1.

FIG. 2 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 2, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, and a communications control module 43.

The communications control module 43 is responsible for handling (generating/sending/receiving) signalling messages and uplink/downlink data packets between the UE 3 and other nodes, including (R)AN nodes 5 and core network nodes. The signalling may include control signalling (including UCI and DCI) related to the PUCCH and/or PDCCH (amongst others). The communications control module 43 is also responsible for controlling the transmission of HARQ-ACK feedback.

Access Network Node (Base Station)

Figure 3:
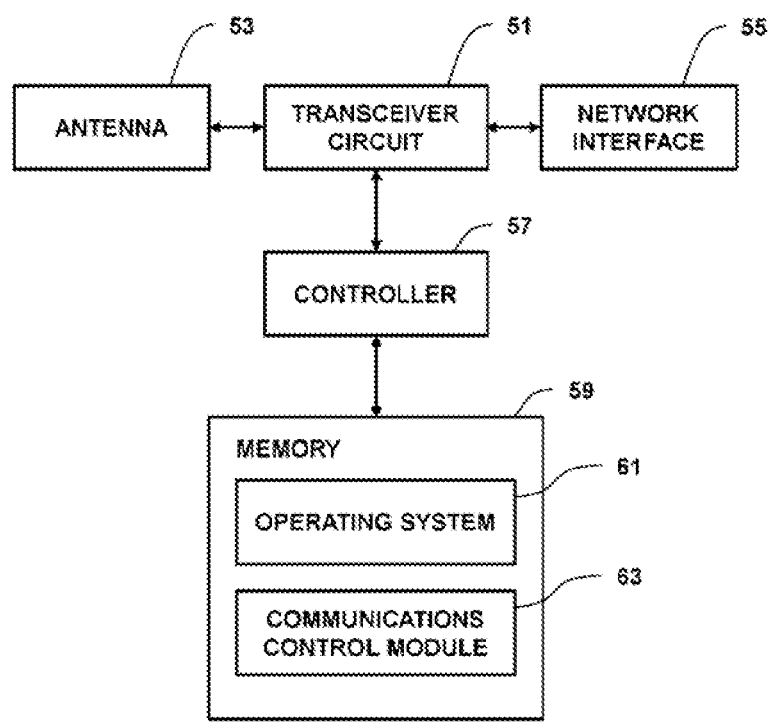
FIG. 3 is a schematic block diagram of an access network node (e.g. base station) forming part of the system shown in FIG. 1.

FIG. 3 is a block diagram illustrating the main components of the base station 5 (or a similar access network node) shown in FIG. 1. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station-base station interface (such as X2/Xn) and an appropriate base station-core network interface (such as S1/NG-C/NG-U). A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, and a communications control module 63.

The communications control module 63 is responsible for handling (generating/sending/receiving) signalling between the base station 5 and other nodes, such as the UE 3 and the core network nodes. The signalling may include control signalling (including UCI and DCI) related to the PUCCH and/or PDCCH (amongst others). The communications control module 63 is also responsible for receiving HARQ-ACK feedback from the UE 3.

Core Network Function

Figure 4:
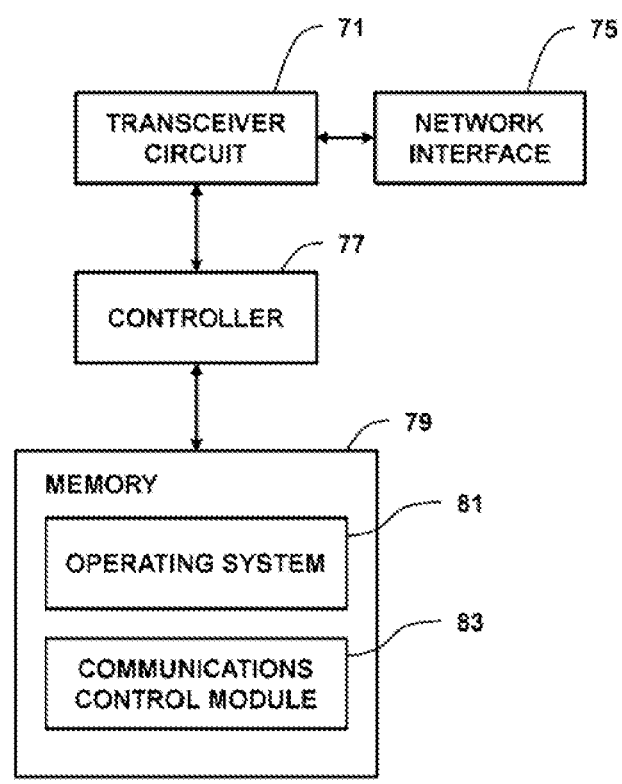
FIG. 4 is a schematic block diagram of a core network node forming part of the system shown in FIG. 1.

FIG. 4 is a block diagram illustrating the main components of a generic core network function, such as the CPF 11 or the UPF 12 shown in FIG. 1. As shown, the core network function includes a transceiver circuit 71 which is operable to transmit signals to and to receive signals from other nodes (including the UE 3, the base station 5, and other core network nodes) via a network interface 75. A controller 77 controls the operation of the core network function in accordance with software stored in a memory 79. The software may be pre-installed in the memory 79 and/or may be downloaded via the telecommunication network 1 or from a removable data storage device (RMD), for example. The software includes, among other things, an operating system 81, and a communications control module 83.

The communications control module 83 is responsible for handling (generating/sending/receiving) signaling between the core network function and other nodes, such as the UE 3, the base station 5, and other RAN/core network nodes.

DETAILED DESCRIPTION

3GPP TR 38.912 v16.0.0, section 8.2.2.2 provides the following overview of the HARQ codebooks and processes used in NR systems:

HARQ-ACK feedback with one bit per TB is supported. Operation of more than one downlink (DL) HARQ processes is supported for a given UE while operation of one DL HARQ process is supported for some UEs. The UE and NR (base station) each have a minimum HARQ processing time. The HARQ processing time at least includes a delay between DL data reception timing to the corresponding HARQ-ACK transmission timing and a delay between uplink (UL) grant reception timing to the corresponding UL data transmission timing.

Asynchronous and adaptive DL HARQ is supported at least for eMBB and URLLC. From the UE's perspective, HARQ ACK/NACK feedback for multiple DL transmissions in time can be transmitted in one UL data/control region. Timing between DL data reception and corresponding acknowledgement is indicated by a field in the DCI from a set of values and the set of values is configured by higher layer. The timing(s) is (are) defined at least for the case where the timing(s) is (are) unknown to the UE.

Code Block Group (CBG)-based transmission with single/multi-bit HARQ-ACK feedback is supported, with the following characteristics:

Only allow CBG based (re)-transmission for the same TB of a HARQ process;
CBG can include all codebooks of a TB regardless of the size of the TB. In such case, UE reports single HARQ ACK bit for the TB;
CBG can include one codebook;
CBG granularity is configurable.

A more detailed description of some example embodiments and features is provided below with reference to FIGS. 5 and 6.

URLLC Feedback is Bundled to One Bit and Appended to the eMBB HARQ Feedback

In this option, URLLC related feedback is provided after the bits representing the eMBB feedback, in the form of one bit of information (i.e. a single bit) indicating whether any URLLC data was not received successfully. For example, the information (1 bit) may be set to a value (e.g. '1') representing 'ACK' when all associated URLLC data has been successfully received and the information (1 bit) may be set to a different value (e.g. '0') representing 'NACK' when at least some of the associated URLLC data has not been received successfully. By way of a specific example, when the original URLLC feedback is in the form or '11111', the UE 3 may provide URLLC related feedback by transmitting one bit of information set to the value '1'. When the original URLLC feedback is in the form of '11011' (or any other form that has at least one zero value), the UE 3 may provide URLLC related feedback by setting the one bit of information to the value '0'.

Thus, effectively, URLLC feedback is bundled to one bit of information and this information is appended to the end of the eMBB HARQ feedback. Using the specific example given above, and assuming an eMBB HARQ feedback in the form of '11011', the actual feedback transmitted by the UE 3 will be in the form of '110111' (the last bit representing an 'ACK' for all URLLC transmissions for which feedback is expected) or in the form of '110110' (where the last bit indicates that the UE 3 has not successfully received one or more of the URLLC transmissions for which feedback is expected).

Beneficially, in order to ensure that latency requirements for URLLC are met, the multiplexed feedback is transmitted on the URLLC HARQ-ACK resource rather than the eMBB resource.

Figure 5:
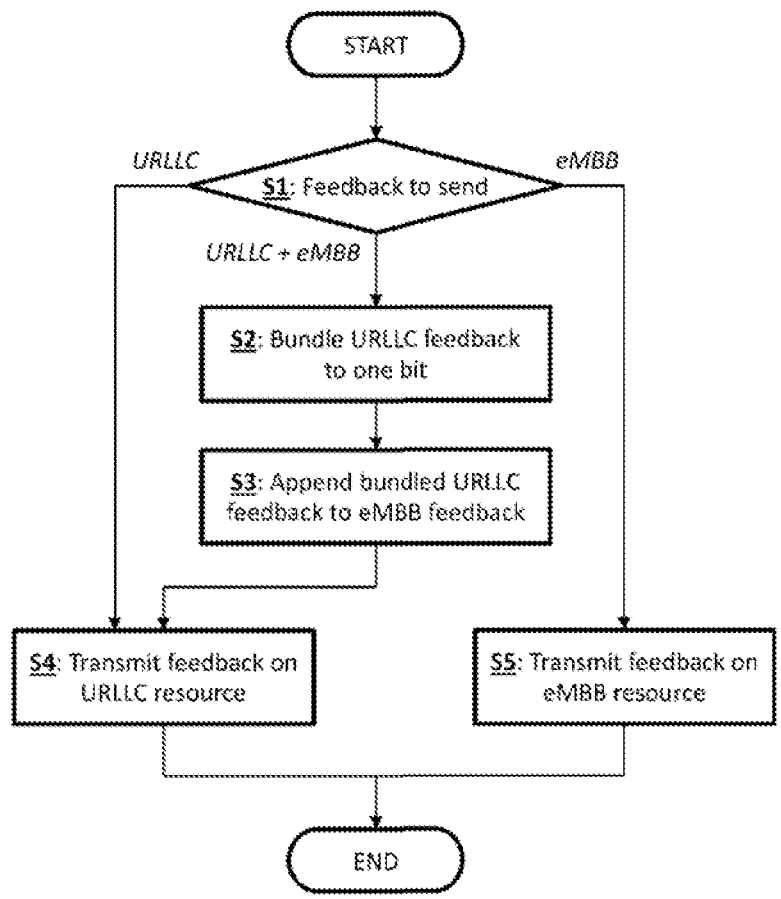
FIG. 5 is a flowchart illustrating schematically some exemplary ways in which HARQ-ACK multiplexing may be performed in accordance with an example embodiment of the present invention.

FIG. 5 is a flowchart illustrating schematically an exemplary way in which URLLC feedback may be bundled to one bit and appended to the eMBB HARQ feedback, in accordance with this option. The flowchart shows the processing performed by the UE 3 (using its communications control module 43) for each HARQ feedback reporting round. It will be appreciated that whilst this flowchart is described with reference to actions performed by the UE 3, the base station 5 (communications control module 63) may also perform the same (or similar) actions for transmitting HARQ feedback to the UE 3.

As can be seen, the procedure depends on what type of feedback needs to be sent. Effectively, steps S4 and S5 represent the scenario when HARQ feedback does not need to be multiplexed because there is only one type of service. When there is only URLLC feedback to be sent (when there is no eMBB transmission), then the feedback (i.e. the 'full' URLLC codebook) is transmitted on the resource associated with URLLC feedback (step S4). Similarly, when there is only eMBB feedback to be sent (e.g. no URLLC transmission within the relevant period), then the feedback (the 'full' eMBB codebook) is transmitted on the resource associated with eMBB feedback (step S5).

Beneficially, when there is feedback to be sent for both the URLLC service and the eMBB service, the UE 3 is configured to perform the above described codebook bundling and multiplexing. Specifically, when the UE 3 determines in step S1 that HARQ-ACK information needs to be send for both URLLC and eMBB, then the UE 3 (using its communications control module 43) bundles the bits of the HARQ codebook to a single bit (step S2). As explained above, when this bit is set to '1' it may indicate that all associated URLCC data packets have been received successfully (hence detailed feedback is omitted). Alternatively, when this bit is set to '0' it may indicate that at least one associated URLCC data packet has not been received successfully.

In step S3, the UE 3 appends the bundled URLLC feedback (in this example, a single bit) to the end of the eMBB codebook, and proceeds to transmitting the HARQ-ACK feedback using the URLLC feedback resources. Beneficially, based on the number of bits received, the base station 5 can determine whether the received feedback is for URLLC only or for URLLC and eMBB.

It will also be appreciated that when the appended bit is set to '0', the base station 5 may be configured to retransmit at least one data packet (e.g. the last data packet or all data packets) for which the feedback was sent.

Multiplexing eMBB and URLLC HARQ-ACK Feedback Based on Codebook (CB) Content

Figure 6:
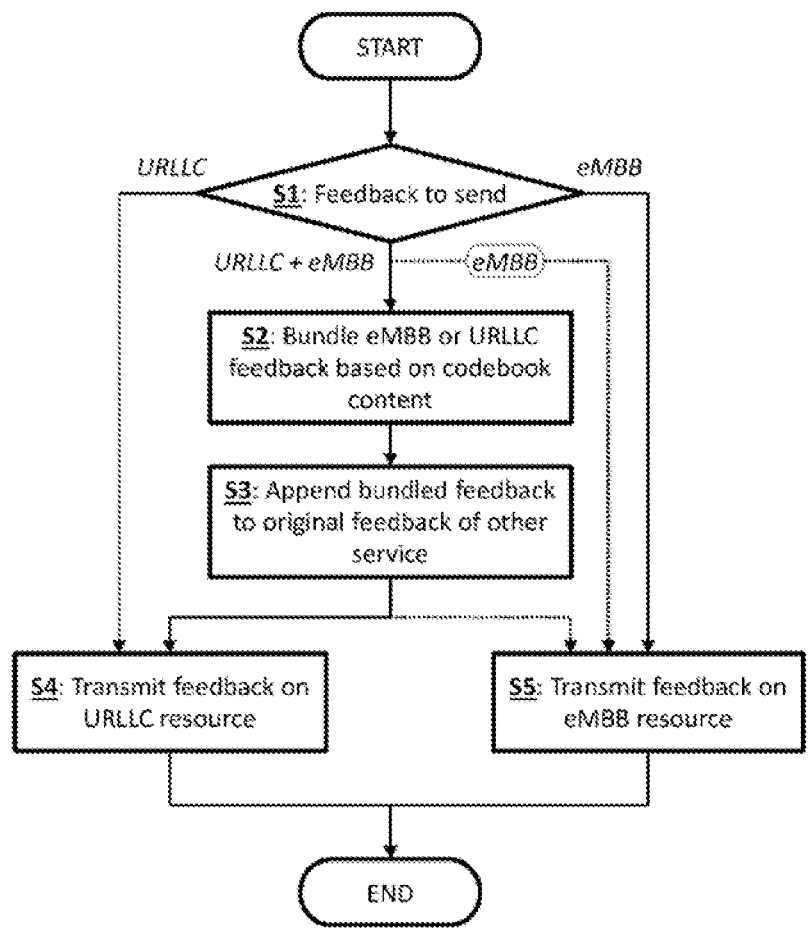
FIG. 6 is a flowchart illustrating schematically some exemplary ways in which HARQ-ACK multiplexing may be performed in accordance with an example embodiment of the present invention.

FIG. 6 is a flowchart illustrating schematically another exemplary way in which bundled and multiplexed feedback may be provided in dependence on the contents of the URLLC/eMBB codebook. It will be appreciated that this flowchart is described with reference to actions performed by the UE 3, the base station 5 may also perform the same (or similar) actions for transmitting HARQ feedback towards the UE 3.

As a variation of the approach described with reference to FIG. 5, the type of service having a bundled feedback may be selected based on one or more bundling rules. For example, the UE 3 (communications control module 43) may be configured to apply the following set of rules (in step S2 of FIG. 6):

- if the URLLC codebook carries both ACK and NACK, then the eMBB bits are bundled into 1 bit and appended at the end of the URLLC codebook;
- if the URLLC codebook carries ACK only (or NACK only), then the URLLC bits are bundled into 1 bit and appended at the end of the eMBB codebook.

The UE 3 may also be configured to apply the following set of rules:

- if the URLLC codebook carries ACK only (or NACK only), and if the eMBB codebook carries both ACK and NACK, then the UE 3 bundles the URLLC bits into 1 bit and appends this bit at the end of the eMBB codebook;
- otherwise, bundle the eMBB bits into 1 bit and append at the end of the URLLC codebook.

In step S3, the bundled feedback (URLLC or eMBB feedback) is appended to the original feedback/codebook of the other service and transmitted to the base station 5 (in step S4 or S5).

In other words, the multiplexed feedback includes the original codebook for one service followed by one bit representing the result of bundling the other codebook's bits. When the bundled eMBB feedback indicates NACK (sent using the URLLC resource in step S4), the full eMBB codebook may be transmitted later (e.g. in step S5 using the eMBB HARQ resource, as shown using a dotted line in FIG. 6). In this case, various Release 16 features, e.g. Type 3 codebook, enhanced Type 2 codebook, and/or NNK1, may be used for transmission of the actual (non compressed) eMBB HARQ-ACK feedback.

If the above rules are applied, an indication of which codebook is bundled may be provided either explicitly (e.g. using an additional bit) in which case the bundled feedback (URLLC or eMBB feedback) may be transmitted using the URLLC resource in step S4. Alternatively, the indication of which codebook is bundled may be provided implicitly (e.g. based on which resource is used for transmitting the feedback). For example, the multiplexed feedback may be transmitted on the resource for uncompressed feedback. The resource carrying multiplexed feedback may implicitly indicate which codebook is bundled. For example, the URLLC resource (step S4) may be used to indicate that bundled URLLC feedback has been multiplexed with the eMBB feedback and the eMBB resource (step S5) may be used to indicate that bundled eMBB feedback has been multiplexed with the URLLC feedback, or vice versa. In this case, the base station 5 needs to perform blind decoding on both colliding resources.

Benefits

Compared to always bundling the eMBB codebook, the above methods transmit more accurate feedback for eMBB when it is determined that URLLC feedback can be bundled into one bit without compromising URLLC service requirements.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the above example embodiments may be applied to both 5G New Radio and LTE systems (E-UTRAN).

A UE may transmit or receive data using dynamic scheduling (also referred to as 'one-shot' grant) and/or using pre-allocated communication resources (e.g. by semi-persistent scheduling or configured grant). It will be appreciated that the above described feedback multiplexing techniques may be applicable for data transmitted using either type of scheduling.

In the above description, URLLC and eMBB were used as exemplary services for which HARQ feedback is transmitted. However, it will be appreciated that the above methods are applicable to other combination of services with different priorities, for example URLLC and any other relatively low priority service (e.g. mMTC and/or the like).

Regarding URLLC latency requirements, it will be appreciated that the base station may configure a suitable URLLC PUCCH resource such that latency and reliability of URLLC HARQ-ACK (whether bundled or not) is satisfied when the above described intra UE HARQ-ACK multiplexing is used. More specifically, the base station may indicate a suitable URLLC PUCCH resource based on the maximum number of HARQ-ACK bits (e.g. the larger of i) the number of eMBB HARQ-ACK bits plus bundled bit(s) and ii) the number of URLLC HARQ-ACK bits plus bundled bit(s)) plus any additional bits indicating which HARQ codebook has been bundled.

In NR HARQ uses an asynchronous mechanism both downlink and uplink whilst in LTE HARQ uplink uses a synchronous mechanism. In case of asynchronous HARQ, multiple HARQ processes may be running in any order and the processes are identified by an associated HARQ process number for each transmission/reception of the HARQ data.

In steps S4 and S5, the transmission of HARQ feedback may be realised using either PUCCH or PUSCH, and different services may use different channels. It will also be appreciated that different HARQ processes may use different channels, if appropriate.

In the above description, the UE, the access network node (base station), and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may include any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the access network node (base station), and the core network node as a signal over a computer network, or on a recording medium. Further, the functionality performed by part or all of this software may be performed using one or more dedicated hardware circuits. However, the use of software modules is preferred as it facilitates the updating of the UE, the access network node, and the core network node in order to update their functionalities.

It will be appreciated that when control plane-user plane (CP-UP) split is employed, the base station may be split into separate control-plane and user-plane entities, each of which may include an associated transceiver circuit, antenna, network interface, controller, memory, operating system, and communications control module. When the base station includes a distributed base station, the network interface (reference numeral 55 in FIG. 3) also includes an E1 interface and an F1 interface (F1-C for the control plane and F1-U for the user plane) to communicate signals between respective functions of the distributed base station. In this case, the communications control module is also responsible for communications (generating, sending, and receiving signalling messages) between the control-plane and user-plane parts of the base station.

The above example embodiments are also applicable to 'non-mobile' or generally stationary user equipment. The above described mobile device may include an MTC/IoT device and/or the like.

The multiplexed HARQ codebook may be derived by appending the HARQ information to the second HARQ codebook. The HARQ information for the URLLC service may be generated by bundling the first HARQ codebook to a single bit. The HARQ information for the URLLC service may include one bit set to a first value (e.g. '1') to indicate that the data associated with the URLLC service has been received successfully or set to a second value (e.g. '0') to indicate that at least a part of the data associated with the URLLC service has not been received successfully.

The second service may include an Enhanced Mobile Broadband (eMBB) service.

The method performed by the UE may include transmitting the multiplexed HARQ codebook using at least one communication resource associated with URLLC.

The at least one predetermined rule may include one or more of:
  a rule specifying that if the first HARQ codebook carries both ACK and NACK then the second HARQ codebook is bundled into one bit and appended at the end of the first HARQ codebook;
  a rule specifying that if the first HARQ codebook carries ACK only or NACK only, and the second HARQ codebook carries both ACK and NACK, then the first HARQ codebook is bundled into one bit and appended at the end of the second HARQ codebook; and
  a rule specifying that the second HARQ codebook is bundled into one bit and appended at the end of the first HARQ codebook if the second HARQ codebook carries ACK only or NACK only.

When the bundled bit is based on the second codebook, the method performed by the UE may further include transmitting the second codebook to the access network node after transmitting the multiplexed HARQ-ACK codebook. The method may further include transmitting information indicating which codebook has been bundled into a single bit. The information indicating which codebook has been bundled into a single bit may include a one bit indicator preceding the multiplexed HARQ codebook.

Various other modifications will be apparent to those skilled in the art and will not be described in further detail here.

The whole or part of the example embodiments disclosed above can be described as, but not limited to, the following supplementary notes.

(Supplementary Note 1)

A method performed by a user equipment (UE), the method including:
  receiving, from an access network node, signals carrying data associated with a first, Ultra-Reliable and Low-Latency Communications (URLLC), service and data associated with a second service;
  generating a first Hybrid Automatic Repeat Request (HARQ) codebook for the data associated with the URLLC service and generating a second HARQ codebook for the data associated with the second service;
  generating, based on the first HARQ codebook, HARQ information for the URLLC service and multiplexing the HARQ information for the URLLC service with the second HARQ codebook to derive a multiplexed HARQ codebook; and
  transmitting, to the access network node, the multiplexed HARQ codebook using at least one communication resource associated with URLLC.

(Supplementary Note 2)

The method according to supplementary note 1, wherein the multiplexed HARQ codebook is derived by appending the HARQ information to the second HARQ codebook.

(Supplementary Note 3)

The method according to supplementary note 1 or 2, wherein the HARQ information for the URLLC service is generated by bundling the first HARQ codebook to a single bit.

(Supplementary Note 4)

The method according to any of supplementary notes 1 to 3, wherein the HARQ information for the URLLC service includes one bit set to a first value (e.g. '1') to indicate that the data associated with the URLLC service has been received successfully or set to a second value (e.g. '0') to indicate that at least a part of the data associated with the URLLC service has not been received successfully.

(Supplementary Note 5)

The method according to any of supplementary notes 1 to 4, wherein the second service includes an Enhanced Mobile Broadband (eMBB) service.

(Supplementary Note 6)

A method performed by a user equipment (UE), the method including:
  receiving, from an access network node, signals carrying data associated with a first, Ultra-Reliable and Low- Latency Communications (URLLC), service and data associated with a second service;

generating a first Hybrid Automatic Repeat Request (HARQ) codebook for the data associated with the URLLC service and generating a second HARQ codebook for the data associated with the second service;

bundling one of the first HARQ codebook and the second HARQ codebook to one bit, in dependence on at least one predetermined rule;

multiplexing the bundled bit with the other one of the first HARQ codebook and the second HARQ codebook to derive a multiplexed HARQ codebook; and transmitting, to the access network node, the multiplexed HARQ codebook.

(Supplementary Note 7)

The method according to supplementary note 6, including transmitting the multiplexed HARQ codebook using at least one communication resource associated with URLLC.

(Supplementary Note 8)

The method according to supplementary note 6 or 7, wherein said at least one predetermined rule includes one or more of:

a rule specifying that if the first HARQ codebook carries both ACK and NACK then the second HARQ codebook is bundled into one bit and appended at the end of the first HARQ codebook;

a rule specifying that if the first HARQ codebook carries ACK only or NACK only, and the second HARQ codebook carries both ACK and NACK, then the first HARQ codebook is bundled into one bit and appended at the end of the second HARQ codebook; and a rule specifying that the second HARQ codebook is bundled into one bit and appended at the end of the first HARQ codebook if the second HARQ codebook carries ACK only or NACK only.

(Supplementary Note 9)

The method according to any of supplementary notes 6 to 8, wherein when the bundled bit is based on the second codebook, the method further includes transmitting the second codebook to the access network node after transmitting said multiplexed HARQ-ACK codebook.

(Supplementary Note 10)

The method according to any of supplementary notes 6 to 9, further including transmitting information indicating which codebook has been bundled into a single bit.

(Supplementary Note 11)

The method according to supplementary note 10, wherein the information indicating which codebook has been bundled into a single bit includes a one bit indicator preceding the multiplexed HARQ codebook.

(Supplementary Note 12)

The method according to any of supplementary notes 6 to 11, wherein the second service includes an Enhanced Mobile Broadband (eMBB) service.

(Supplementary Note 13)

A method performed by an access network node, the method including:

transmitting, to a user equipment (UE), signals carrying data associated with a first, Ultra-Reliable and Low-Latency Communications (URLLC), service and data associated with a second service; and receiving, from the UE, a multiplexed Hybrid Automatic Repeat Request (HARQ) codebook using at least one communication resource associated with URLLC, wherein the multiplexed HARQ codebook is based on HARQ information for the URLLC service generated based on a first HARQ codebook for the data associated with the URLLC service and multiplexed with a second HARQ codebook for the data associated with the second service.

(Supplementary Note 14)

A method performed by an access network node, the method including:

transmitting, to a user equipment (UE), signals carrying data associated with a first, Ultra-Reliable and Low-Latency Communications (URLLC), service and data associated with a second service; and receiving, from the UE, a multiplexed Hybrid Automatic Repeat Request (HARQ) codebook, wherein the multiplexed HARQ codebook includes i) a first HARQ codebook for the data associated with one of the URLLC service and the second service and ii) a bundled bit based on a second HARQ codebook for the data associated with the other one of the URLLC service and the second service.

(Supplementary Note 15)

User equipment (UE) including:

means for receiving, from an access network node, signals carrying data associated with a first, Ultra-Reliable and Low-Latency Communications (URLLC), service and data associated with a second service;

means for generating a first Hybrid Automatic Repeat Request (HARQ) codebook for the data associated with the URLLC service and for generating a second HARQ codebook for the data associated with the second service;

means for generating, based on the first HARQ codebook, HARQ information for the URLLC service and for multiplexing the HARQ information for the URLLC service with the second HARQ codebook to derive a multiplexed HARQ codebook; and means for transmitting, to the access network node, the multiplexed HARQ codebook using at least one communication resource associated with URLLC.

(Supplementary Note 16)

User equipment (UE) including:

means for receiving, from an access network node, signals carrying data associated with a first, Ultra-Reliable and Low-Latency Communications (URLLC), service and data associated with a second service;

means for generating a first Hybrid Automatic Repeat Request (HARQ) codebook for the data associated with the URLLC service and for generating a second HARQ codebook for the data associated with the second service;

means for bundling one of the first HARQ codebook and the second HARQ codebook to one bit, in dependence on at least one predetermined rule;

means for multiplexing the bundled bit with the other one of the first HARQ codebook and the second HARQ codebook to derive a multiplexed HARQ codebook; and means for transmitting, to the access network node, the multiplexed HARQ codebook.

(Supplementary Note 17)

An access network node including:

means for transmitting, to a user equipment (UE), signals carrying data associated with a first, Ultra-Reliable and Low-Latency Communications (URLLC), service and data associated with a second service; and means for receiving, from the UE, a multiplexed Hybrid Automatic Repeat Request (HARQ) codebook using at least one communication resource associated with URLLC, wherein the multiplexed HARQ codebook is based on HARQ information for the URLLC service generated based on a first HARQ codebook for the data associated with the URLLC service and multiplexed with a second HARQ codebook for the data associated with the second service.

(Supplementary Note 18)

An access network node including:

means for transmitting, to a user equipment (UE), signals carrying data associated with a first, Ultra-Reliable and Low-Latency Communications (URLLC), service and data associated with a second service; and means for receiving, from the UE, a multiplexed Hybrid Automatic Repeat Request (HARQ) codebook, wherein the multiplexed HARQ codebook includes i) a first HARQ codebook for the data associated with one of the URLLC service and the second service and ii) a bundled bit based on a second HARQ codebook for the data associated with the other one of the URLLC service and the second service.

This application is based upon and claims the benefit of priority from United Kingdom Patent Application No. 2016378.8, filed on Oct. 15, 2020, the disclosure of which is incorporated herein in its entirety by reference.

The invention claimed is:

1. A method performed by a user equipment (UE), the method comprising:
   receiving, from an access network node, a signal carrying first data corresponding to a first service and second data corresponding to a second service;
   generating a first Hybrid Automatic Repeat Request (HARQ) codebook for the first data to be transmitted in a first physical uplink channel;
   generating a second HARQ codebook for the second data to be transmitted in a second physical uplink channel which is different from the first physical uplink channel;
   generating, by reducing bits of content to be transmitted in the first physical uplink channel based on the content including negative acknowledgement information only, uplink control information for the first service;
   multiplexing the uplink control information with the second HARQ codebook to derive a multiplexed uplink control information; and
   transmitting, to the access network node, the multiplexed uplink control information in the second physical uplink channel.

2. The method according to claim 1, wherein, the uplink control information is one bit and appended after the second HARQ codebook.

3. A method performed by an access network node, the method comprising:
   transmitting, to a user equipment (UE), a signal carrying first data corresponding to a service and second data corresponding to a second service; and
   receiving, from the UE, a multiplexed uplink control information in a second physical uplink channel which is different from a first physical uplink channel, wherein
      the multiplexed uplink control information is based on uplink control information for the first service generated by reducing bits of content to be transmitted in the first physical uplink channel based on the content including negative acknowledgement information only, and multiplexed with a second Hybrid Automatic Repeat Request HARQ codebook for the second data,
   a first HARQ codebook has been generated to be transmitted in the first physical uplink channel, and
   the second HARQ codebook has been generated to be transmitted in the second physical uplink channel.

4. A user equipment (UE) comprising:
a memory storing instructions; and
at least one processor configured to process the instructions to:
   receive, from an access network node, a signal carrying first data corresponding to a first service and second data corresponding to a second service;
   generate a first Hybrid Automatic Repeat Request (HARQ) codebook for the first data to be transmitted in a first physical uplink channel;
   generate a second HARQ codebook for the second data to be transmitted in a second physical uplink channel which is different from the first physical uplink channel;
   generate, by reducing bits of content to be transmitted in the first physical uplink channel based on the content including negative acknowledgement information only, uplink control information for the first service;
   multiplex the uplink control information with the second HARQ codebook to derive a multiplexed uplink control information; and
   transmit, to the access network node, the multiplexed uplink control information in or the second physical uplink channel.

5. An access network node comprising:
a memory storing instructions; and
at least one processor configured to process the instructions to:
   transmit, to a user equipment (UE), a signal carrying first data corresponding to a first service and second data corresponding to a second service; and
   receive, from the UE, a multiplexed uplink control information in a second physical uplink channel, which is different from a first physical uplink channel, wherein
      the multiplexed uplink control information is based on uplink control information for the first service generated by reducing bits of content to be transmitted in the first physical uplink channel based on the content including negative acknowledgement information only, and multiplexed with a second Hybrid Automatic Repeal Request (HARQ) codebook for the second data, and
   a first HARQ codebook has been generated to be transmitted in the first physical uplink channel, and
   the second HARQ codebook has been generated to be transmitted in the second physical uplink channel.

* * * * *